T 861,009

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED APRIL 1, 1969

861 O.G. 18

731,285

PROCESS FOR PREPARING POLYCARBONAMIDE

James L. Bleasdale, Waynesboro, Va., assignor to E. I. du Pont de Nemours and Company, Wilmington, Del., a corporation of Delaware

Filed May 22, 1968. Published Apr. 1, 1969

Class 260—78

No Drawing. 17 Pages Specification

In the process for preparing a linear polycarbonamide having an inherent viscosity of at least 0.8 by a solution condensation reaction between an aromatic acyl halide and an aromatic amine, the molecular weight distribution is controlled by conducting the reaction in the presence of a monofunctional reactant that may be:

(a) water, (b) an alcohol having a $pK_H$ of 10 to 18 as determined in aqueous solution, (c) an organic amine having a $pK_{OH}$ of 3 to 12 as determined in aqueous solution, or (d) an organic acyl halide having a $pK_H$ of 4 to 10 as determined in aqueous solution as the corresponding acid, the amounts of aromatic acyl halide, aromatic amine and monofunctional reactant being such that the acyl halide groups are reacted with an essentially equal number of proton donor groups, and further, that 0.07 to 5 mol percent of said reactant is present based on the amount of polycarbonamide produced.